(12) United States Patent
Nishiyama et al.

(10) Patent No.: US 6,421,693 B1
(45) Date of Patent: Jul. 16, 2002

(54) METHOD TO AUTOMATICALLY FILL ENTRY ITEMS OF DOCUMENTS, RECORDING MEDIUM AND SYSTEM THEREOF

(75) Inventors: Soichi Nishiyama; Takeo Yasukawa; Koichi Murakami, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/172,767

(22) Filed: Oct. 15, 1998

(30) Foreign Application Priority Data

Apr. 20, 1998 (JP) .......................................... 10-109969

(51) Int. Cl.$^7$ .............................................. G06F 17/21
(52) U.S. Cl. ...................................... 707/507; 707/505
(58) Field of Search ................................ 707/505, 506, 707/507, 508

(56) References Cited

U.S. PATENT DOCUMENTS

| | | | | |
|---|---|---|---|---|
| 5,794,259 A | * | 8/1998 | Kikinis | 707/507 |
| 5,799,115 A | * | 8/1998 | Asano et al. | 382/305 |
| 6,026,187 A | * | 2/2000 | Siegel | 382/213 |

* cited by examiner

*Primary Examiner*—Stephen S. Hong
(74) *Attorney, Agent, or Firm*—Staas & Halsey LLP

(57) ABSTRACT

An item data entry method by detecting a constituent element which represents an entry item from among received Internet documents, based on the document structure data of a document such as an HTML document containing the entry item key, comparing the entry item key of the detected entry item with the entry item key registered in a database, thereby automatically entering in the entry item the user's name, address, phone number, and the like corresponding to the entry item key registered in the database which has been matched as a result of comparison.

9 Claims, 11 Drawing Sheets

METHOD TO AUTOMATICALLY FILL ENTRY ITEMS OF DOCUMENTS, RECORDING MEDIUM AND SYSTEM THEREOF

BACKGROUND OF THE INVENTION

The present invention relates to an item data entry method for automatically entering specific data specified at the transmission destination such as a user's name, address, telephone number in an entry item of a document in which a constituent element disposed between tags "FORM" which are structure data of a document like an HTML (HyperText Markup Language) document provided by a World-Wide Web server of the Internet indicates that the constituent element displays the entry item where data like text data is allowed to be entered on the browser at the transmission destination, and further relates to a recording medium where the program of the method is stored.

With the spread of the Internet, more and more users have come to receive HTML documents along with increasing program downloads and accesses to home pages. These HTML documents have download application pages, questionnaires, prize contests entry pages provided with an entry item for a user who has received a document to enter his/her personal data such as name, address, and phone number.

In these documents, when a user enters the above-mentioned personal data in an entry item on the browser and presses a transmission button, errors of entered character types and incomplete entry to necessary items are checked, and if the entry is correct, then an HTML document restructured based on the entered personal data is transferred to the transmitter as a mail or the like.

Thus, a user must key-in his/her unique data such as name, address, and phone number every time he/she transfers an answer to a questionnaire, an application page, and an entry page, which not only makes the entry operation troublesome, but also requires that the user check with the eye before transmission whether the data has been correctly entered or not.

Some browsers have their own formats of keywords for entry items, for example, assigning the keyword "name" to the data on names, and automatically enters data in the entry item when the keyword matches the format.

However, the browser decides keywords independently so that when the transmitting side and the receiving side of a document apply different browsers from each other and their formats for keywords do not match such as a case where one browser assigns the keyword "name" to the data on names and the other assigns the keyword "names", the data is not automatically entered in the entry item. Consequently, a user must key-in the necessary data in the entry item.

BRIEF SUMMARY OF THE INVENTION

The present invention has been devised to solve these problems and has an object of providing an item data entry method and a recording medium in which the program of this method is stored for automatically entering specific data in an entry item even when the user at the transmitting side and the user at the receiving side use browsers having different keyword formats from each other or even when to the entry item is assigned a keyword out of the format if the keyword is once registered to a database by storing the specific data such as the user's name and address specified at the transmission destination correspondingly to the keyword of the entry item in which the specific data is to be entered in a database, by searching the database for the specific data with the keyword being matched, and by automatically entering the specific data in the entry item or by allowing the keyword and the specific data to be additionally registered to the database.

The present invention is characterized by registering an entry item key and specific data in a database or updating contents registered in the database; detecting a constituent element representing an entry item from among the received document, based on the document structure data; comparing an entry item key of a detected entry item with an entry item key registered in the database; and restructuring the document for item data input by attaching to the entry item specific data corresponding to the entry item key in the database which has been matched with the entry item key of the detected entry item as a result of the comparison.

Consequently, when the user at the receiving side and the user at the transmitting side use browsers having different keyword formats from each other, specific data is automatically entered in the corresponding entry item if the entry item key registered in the database matches the keyword.

The item data entry method of the present invention is characterized by registering specific data to be entered correspondingly to the entry item key in the database in which an entry item key is registered.

Consequently, since the entry item key usually used is registered in the database, specific data to be entered is known which facilitates the setting of the database.

The item data entry method of the present invention is characterized by, when the comparison result indicates that an entry item key to be matched is not registered in the database, requiring an input of the entry item key and specific data, and additionally registering in the database the entry item key and the specific data correspondingly which have been input in response to the requirement.

Consequently, when the user at the receiving side and the user at the transmitting side use browsers having different keyword formats from each other, or when to the entry item is assigned a keyword out of the format, specific data is automatically entered in the entry item.

The item data entry method of the present invention is characterized by additionally registering another entry item key for specific data to which an entry item key having already been registered in the database.

Consequently, when the user at the receiving side and the user at the transmitting side use browsers having different keyword formats from each other, or when to the entry item is assigned a keyword out of the format, specific data is automatically entered in the entry item.

The item data entry method of the present invention is characterized by restructuring a document with an entry item containing specific data and an entry item attached with the specific data and text data indicating an item to be entered to the entry item as constituent elements.

Consequently, users can easily check the specific data which has been automatically entered in the entry item and the entry item in which the specific data has not been automatically entered, and enter the specific data.

The item data entry method of the present invention is characterized by restructuring a document which makes an entry item containing an entry item attached with specific data to be displayed in a manner different from other constituent elements.

Consequently, users can easily check with the eye the specific data which has been automatically entered in the entry item and the entry item in which the specific data has not been automatically entered.

The item data entry method of the present invention is characterized by selecting a database from among a plurality of databases and comparing the entry item key of the detected entry item with an entry item key registered in the selected database.

Consequently, when different databases are provided for example, for Japanese language, for English language, for a certain person, and for business, the databases as the comparison target of the entry item key are narrowed down, which reduces the time to be required for the comparison.

The item data entry method of the present invention is characterized by receiving and storing a document containing the entry item; entering and setting a transmission timing of a document which has been restructured from the document received; and executing a detection of an entry item from the received document, comparison of the entry item key, and restructuring of a document at a timing in accordance with the transmission timing and of transmitting the restructured document at the transmission timing.

Consequently, if only users set the transmission timing of application pages, answers to questionnaires, entry pages, or the like, they are automatically transmitted at the set timing, without being forgotten to transmit.

The item data entry method of the present invention is characterized by storing data on transmission results of a document and data on an entry item in which specific data has not been entered; and outputting the stored data responsive to the request to refer to the stored contents.

Consequently, users can additionally register the entry item key of the entry item in which specific data has not been entered and the specific data thereof to the database so as to complete the database.

The item data entry method of the present invention is characterized by extracting a feature of identification data of a transmission destination contained in data related to transmission results of a document such as log data and/or a feature of stored identification data of a transmitting destination when the data to identify the transmitting destination of the document such as history data or bookmark is stored, and selectively storing a document which agrees with the extracted feature among the received documents.

Consequently, documents which suit the user's tastes and objects are stored.

The item data entry method of the present invention is characterized by a server receiving and storing a document containing the entry item; and transmitting the document to a client.

Consequently, the number of documents to be stored by the client increases.

The item data entry method of the present invention is characterized by, when identification data to identify a transmitting destination of a document is registered at a client and data related to transmission results of the document is stored at the client, a server receiving the identification data of a transmitting destination contained in the data related to the transmission results of the document and/or registered identification data of the transmitting destination from the client; the server extracting a feature contained in the identification data; and the server transmitting to the client a document which agrees with the extracted feature from among documents containing entry items received and stored by the server.

Consequently, the documents which suit the user's tastes and objects are provided from the server.

The item data entry method of the present invention is characterized by the server allowing the client to browse the stored document in response to the client's request.

Consequently, the client can receive desirable documents from the documents he has browsed.

The item data entry method of the present invention is characterized by calculating a degree of resemblance of an entry item key as comparison target which has partially matched with an already registered entry item key as a result of the comparison in the third step; and considering that an entry item key is matched as a result of the comparison when the degree of resemblance is equal to or higher than a predetermined value.

Consequently, even when an uncertain entry item key is entered, the specific data is automatically entered in the entry item.

The item data entry method of the present invention is characterized by setting the predetermined value.

Consequently, the user can arbitrarily set the level at which the entry item keys are regarded as being matched.

The item data entry method of the present invention is characterized by registering in the database the entry item key as the comparison target having a degree of resemblance equal to or higher than the predetermined value and specific data to be entered correspondingly to the entry item key.

Consequently, the entry item key similar to an already registered entry item key and specific data can be additionally registered to the database so as to customize the database for the user.

The above and further objects and features of the invention will more fully be apparent from the following detailed description with accompanying drawings.

DETAILED DESCRIPTION OF THE INVENTION

Figure 1:
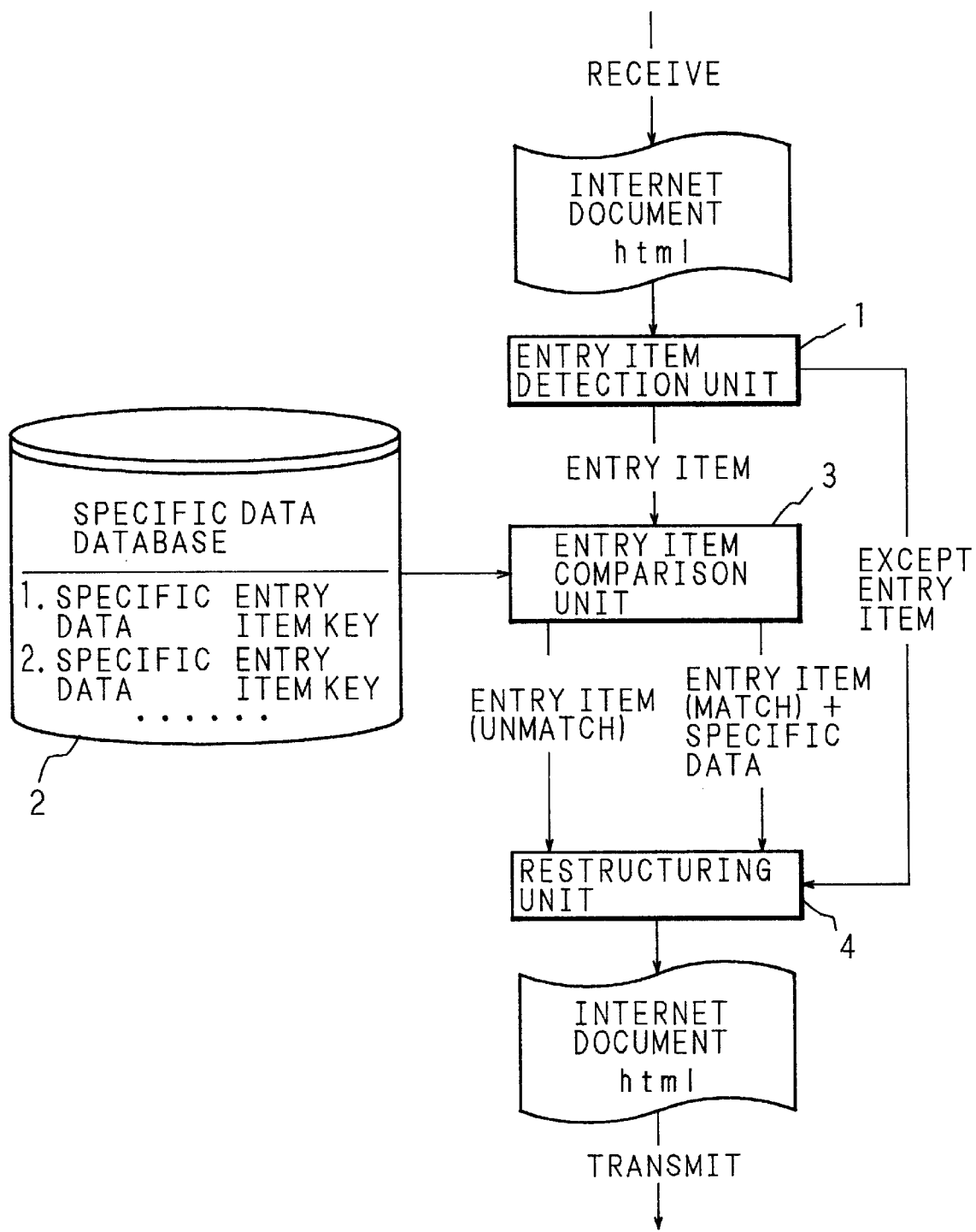
FIG. 1 is a principle drawing of the present invention.

FIG. 1 is a principle drawing of the present invention and shows a functional block diagram of a communication device performing the item data entry method of the present invention (hereinafter referred to as the method of the present invention).

An entry item detection unit 1 detects a tag <FORM> (–</FORM>) as document structure data from among HTML Internet documents received via the Internet, thereby to detect the entry item to enter specific data unique to the user such as his/her name and address at the receiving side of the document.

In an HTML document, a tag <INPUT TYPE="text" option> for forming a text field is disposed between <FORM> and </FORM>. The options defined for the tag are NAME="character string" (definition of the field corresponding to entry item key such as "name" or "address" of the present invention), SIZE="n" (size of the input field: n byte), VALUE="character string" (first entered character), and MAXLENGTH="n" (the number of characters allowed to be entered: n byte).

In a specific data database 2, entry item keys to indicate attributes of the entry items such as "name" and "address" are registered, and specific data such as the user's name, address, and the like which have been keyed-in by the user correspondingly to these entry item keys are registered.

An entry item comparison unit 3 compares the entry item key of an entry item detected by the entry item detection unit 1 with the entry item key registered in the specific data database 2. The entry items which have been matched as the comparison results are transferred to a restructuring unit 4 with attaching corresponding specific data registered in the specific data database 2, whereas the entry items which have been unmatched are transferred as they are to the restructuring unit 4.

The restructuring unit 4 combines the constituent elements other than the entry items detected by the entry item detection unit 1 and the constituent elements consisting of either the entry items with the specific data being attached by the entry item comparison unit 3 or the entry items only, so as to restructure an HTML Internet document. As a result, an Internet document in which the specific data registered in the specific data database 2 has been automatically entered in the entry item is formed. When the user presses the transmission button, the Internet document is transferred to the determined address.

Figure 2:
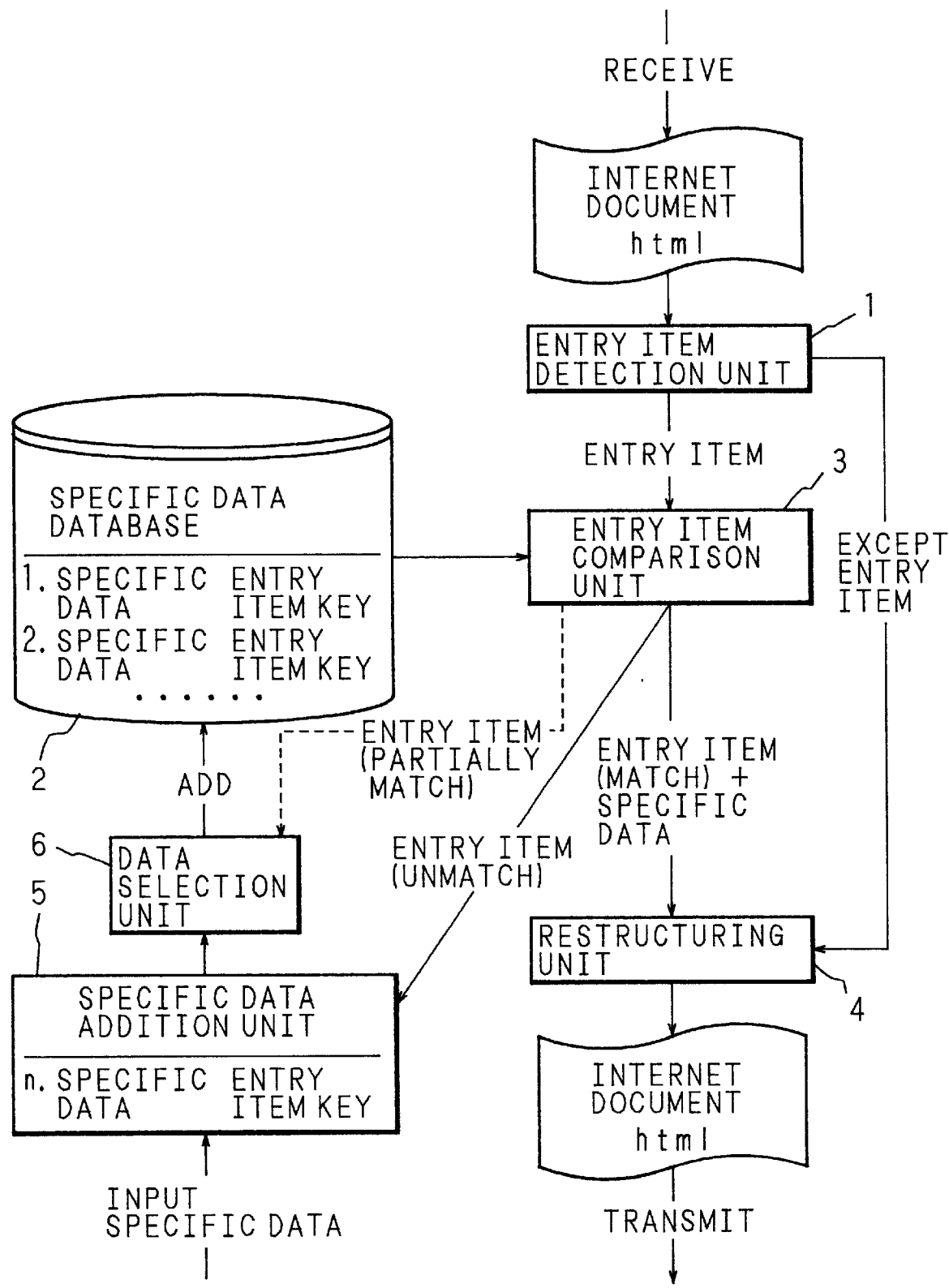
FIG. 2 is a functional block diagram of Embodiment 1 of a communication device which performs the method of the present invention.

FIG. 2 shows a functional block diagram of Embodiment 1 of the communication device which performs the method of the present invention.

The same units as those shown in the principle drawing of FIG. 1 are designated by the same reference numbers and their explanation is omitted.

In the present embodiment, a specific data addition unit 5 additionally registers to the specific data database 2 either an entry item key and specific data keyed-in by the user correspondingly or an entry item key unmatched as the result of the comparison by the entry item comparison unit 3 with the contents registered in the specific data database 2 and the specific data keyed-in by the user for the entry item key correspondingly.

As will be explained in detail later (refer to FIG. 8), the entry item comparison unit 3 may additionally register to the specific data database 2 the entry item key which does not completely match the entry item key already registered in the specific data database 2 but partly matches and has a degree of resemblance equal to or higher than a predetermined value and the specific data keyed-in by the user for this entry item key correspondingly.

A data selection unit 6 requires the user to select the entry item key and the specific data to be registered by, for example, opening a pop-up menu when the entry item key and the specific data additionally registered to the specific data database 2 are equal to those already registered in the specific data database 2. As a result, register errors such as double register of an entry item key and a specific data or the register of a plurality of specific data for a single entry item key can be prevented.

Figure 3:
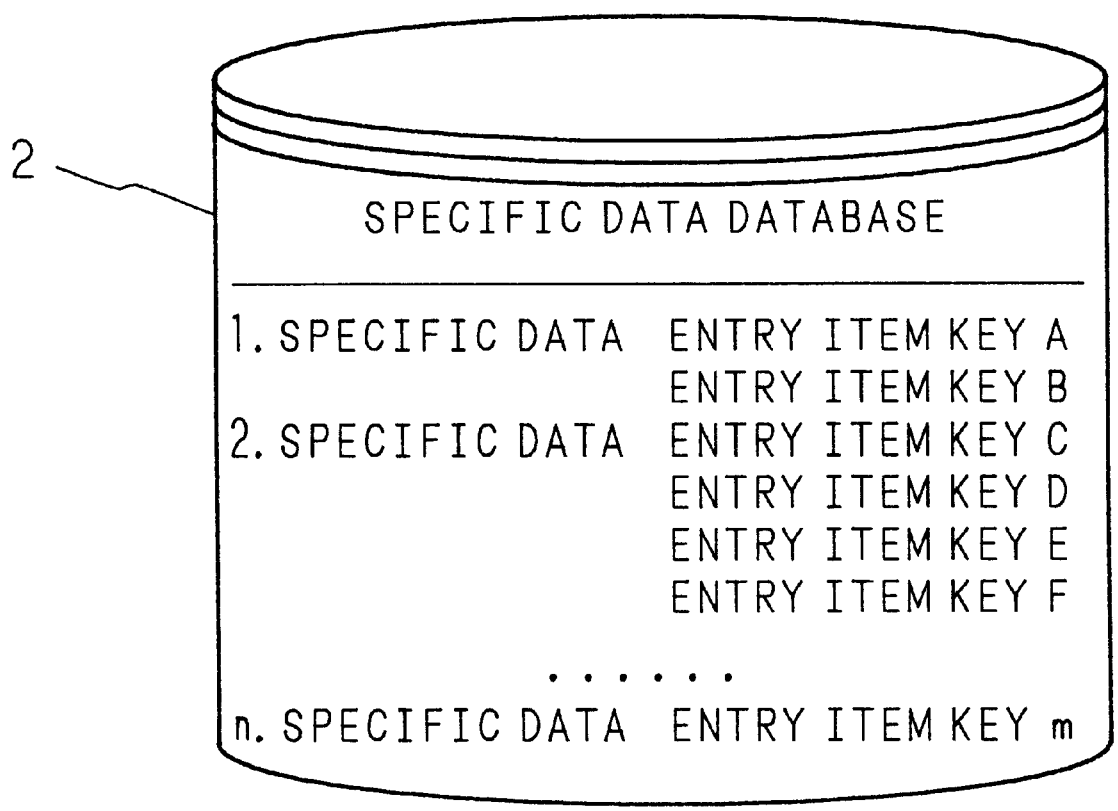
FIG. 3 is a conceptual drawing of an example of a modified specific data database.

FIG. 3 shows a conceptual drawing of an example of a modified specific data database.

As shown in the drawing, a plurality of entry item keys can be registered for a single piece of specific data. For example, for the specific data of name "Fujitu Taro", entry item keys such as "name" and can be registered. It is impossible to register a plurality of pieces of specific data for a single entry item key.

Figure 4:
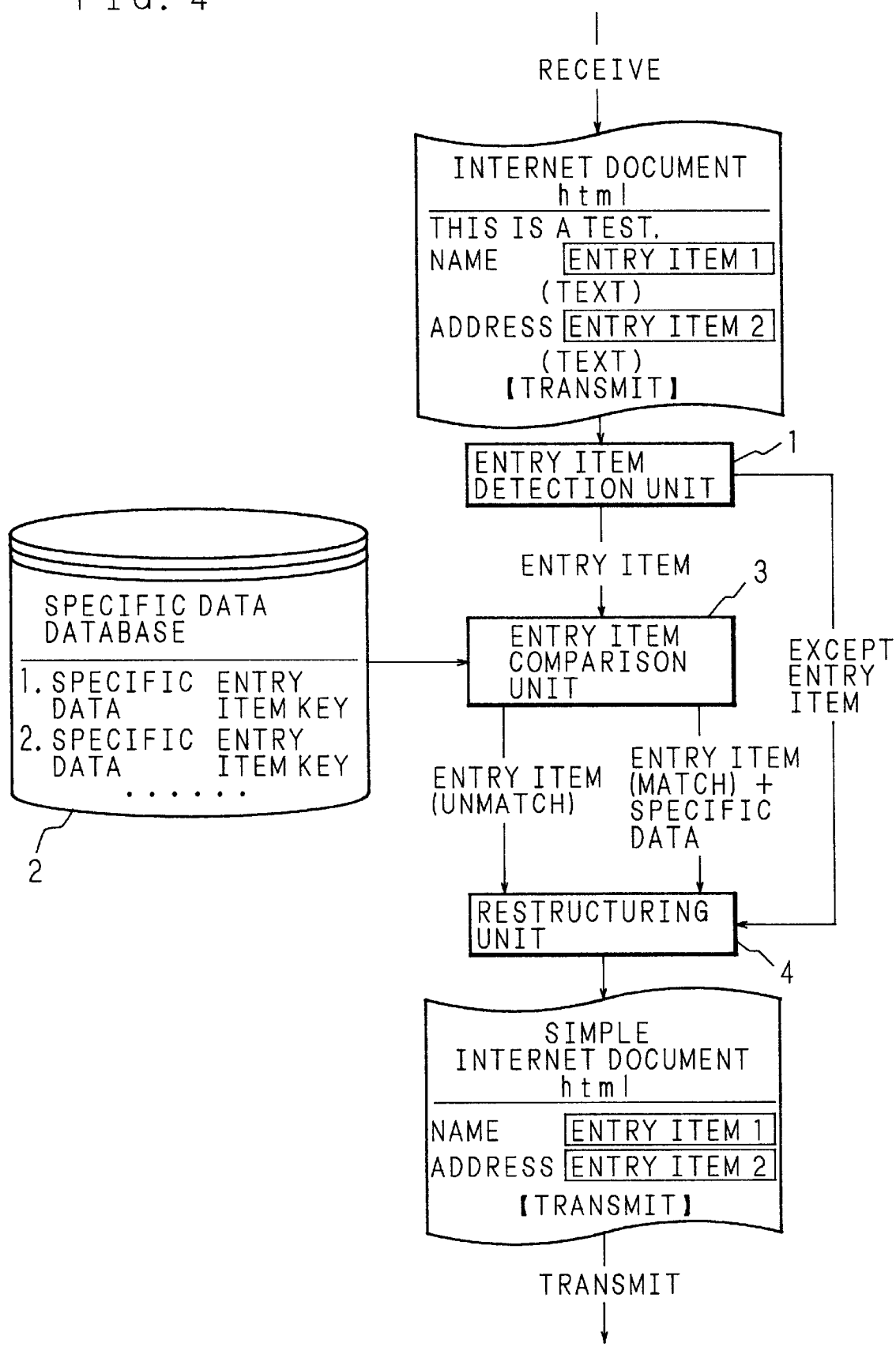
FIG. 4 is a functional block diagram of Embodiment 2 of the communication device which performs the method of the present invention.

FIG. 4 shows a functional block diagram of Embodiment 2 of the communication device which performs the method of the present invention.

The restructuring unit 4 of the present embodiment has a function of restructuring a simple Internet document mainly consisting of entry items including the entry items in which specific data has been automatically entered and supporting the user's check with the eye, in addition to the function shown in the principle drawing of FIG. 1 for restructuring an HTML Internet document by combining the constituent elements other than the entry item detected by the entry item detection unit 1 and the constituent element consisting of either the entry item and the specific data attached thereto by the entry item comparison unit 3 or the entry item only. It is necessary to add text data such as "name" and "address" to show the attribute of the entry item before the entry item of the simple Internet document. In that case, text data which exists immediately before <INPUT TYPE=TEXT is extracted.

In the display of the simple Internet document mainly consisting of entry items as described above, the entry items to which specific data has been automatically entered and the other entry items may be displayed in different colors from each other. The entry items to which specific data have not been automatically entered may be exclusively displayed together at one place.

It is also possible that an Internet document containing other constituent elements other than entry items such as sentence parts is restructured as shown in the principle drawing of FIG. 1, and the display of the entry items is made conspicuous by, for example, displaying the entry items in a color different from the other constituent elements such as sentence parts, or using different fonts or character types, or blinking the display of the other constituent elements.

A user checks the simple Internet document and the Internet document with the eye and pushes the transmission button. As a result, the Internet document in which sentence parts and the entry items to which specific data registered in the specific data database 2 has been automatically entered are combined is transmitted to the predetermined address.

Figure 5:
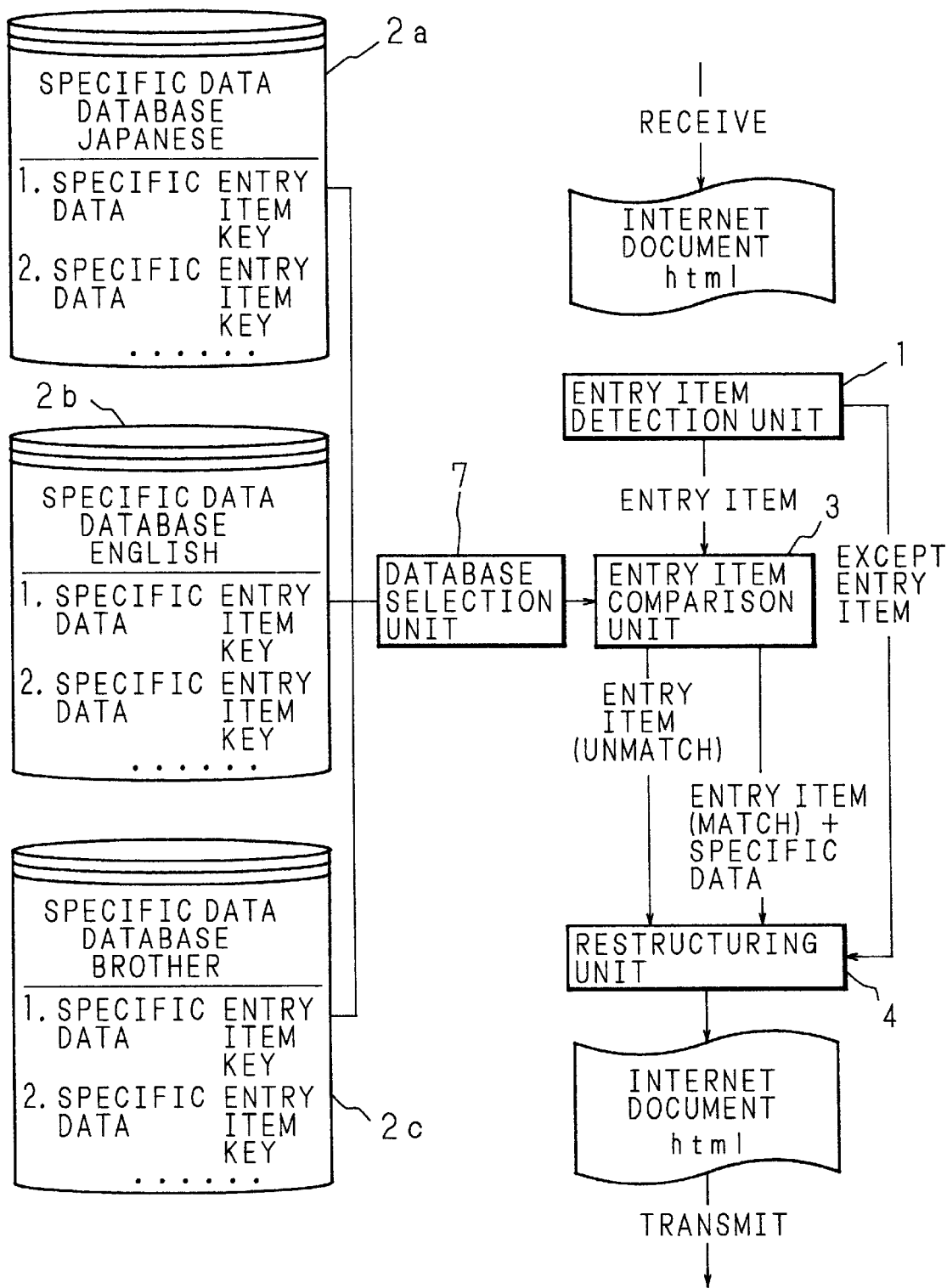
FIG. 5 is a functional block diagram of Embodiment 3 of the communication device which performs the method of the present invention.

FIG. 5 shows a functional block diagram of Embodiment 3 of the communication device which performs the method of the present invention. The same units as those shown in FIG. 1 are designated by the same reference numbers and their explanation is omitted.

In the present embodiment, there are specific data databases 2a, 2b, and 2c provided for different categories or different users such as for Japanese language, for English language, and for a brother. A database selection unit 7 selects one of the databases as the specific data database 2 for the comparison in the entry item comparison unit 3, based on user identification data such as user ID or password or based on the user's choice.

Figure 6:
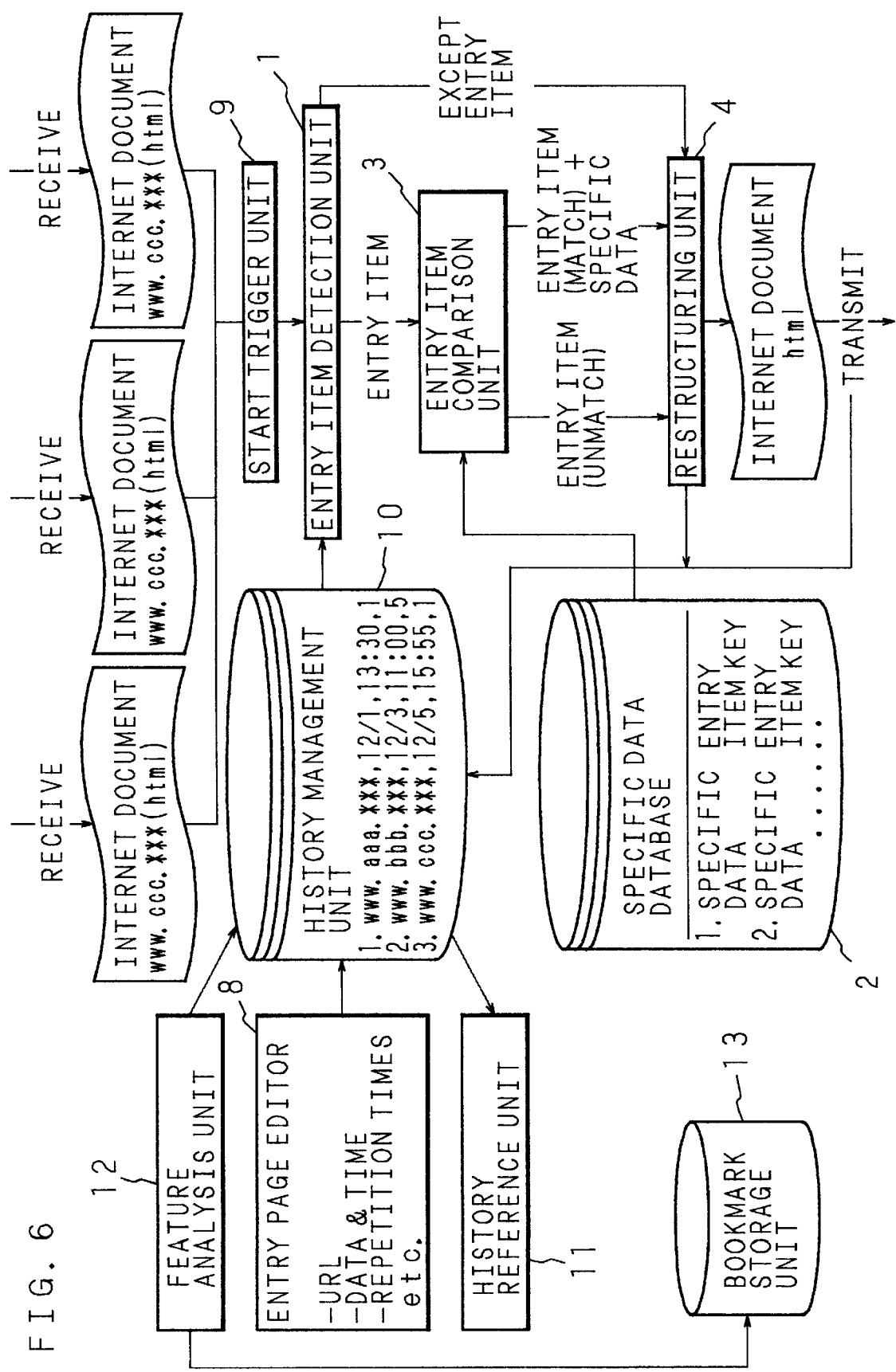
FIG. 6 is a functional block diagram of Embodiment 4 of the communication device which performs the method of the present invention.

FIG. 6 shows a functional block diagram of Embodiment 4 of the communication device which performs the method of the present invention. The same units as those shown in FIG. 1 are designated by the same reference numbers and their explanation is omitted.

An entry page editor 8 stores in a history management unit 10 the Internet document (page) which has been received via the Internet containing entry items and transmission contents designated by the user (URL, transmission time and date, transmission repetition times, and the like).

The history management unit 10 stores communication record (log file) including transmission results such as transmission success or failure, the time required for transmission (the time of starting or ending transmission) and the cause of transmission failure, and stores the comparison results including the data of the entry item key which has been unmatched as a result of the comparison by the entry item comparison unit 3.

A bookmark storage unit 13 stores the URL of a site selected by the click operation of the user and the site's name when the site is accessed.

A start trigger unit 9 generates a reading timing of an Internet document containing an entry item stored in a memory (not shown), based on the transmission contents stored in the history management unit 10, and successively makes the entry item detection unit 1 detect an entry item in the document, the entry item comparison unit 3 compare entry item keys, and the restructuring unit 4 restructure the document. The restructuring unit 4 refers to the transmission contents of the document stored in the history management unit 10 and makes the Internet document restructured by automatically entering specific data in an entry item to be transmitted to a specified address at a specified time for specified number of times.

A feature analysis unit 12 extracts features such as the log file stored in the history management 10, the URL of a bookmark stored in the bookmark storage unit 13, the frequency of appearance of a character string contained in the site name, and the frequency of appearance of a character string in an Internet document stored in the history management unit 10 or the like, and analyses the user's inclination such as tastes and objects in the transmission of a document containing an entry item based on the extracted features.

A history reference unit 11 outputs history data in response to the instruction of the user so that the user can refer to the history data.

Figure 7:
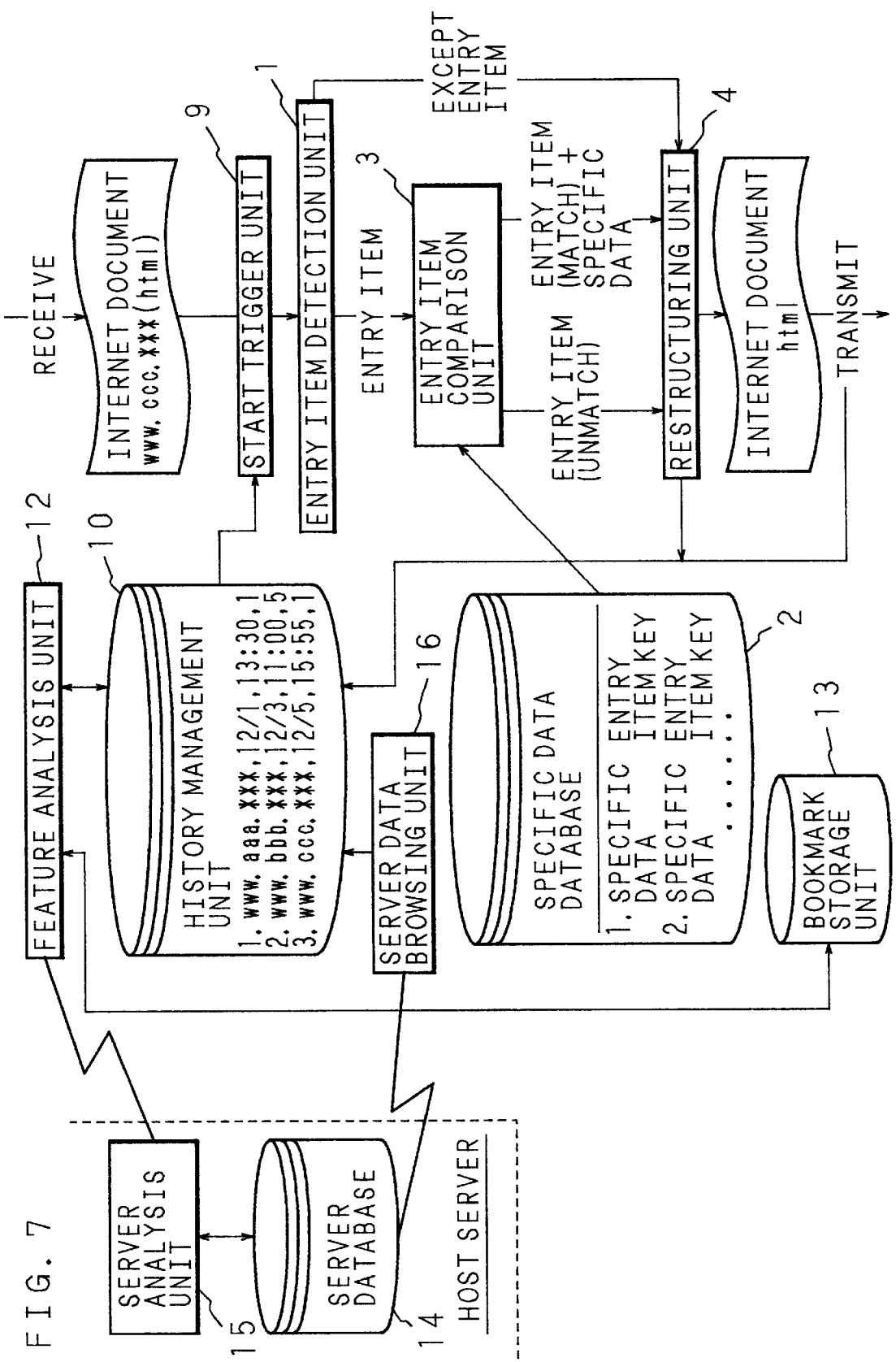
FIG. 7 is a functional block diagram of Embodiment 5 of the communication device which performs the method of the present invention.

FIG. 7 shows a functional block diagram of Embodiment 5 of the communication device which performs the method of the present invention. The same units as those shown in FIGS. 1 and 6 are designated by the same reference numbers and their explanation is omitted.

In the present embodiment, a server analysis unit 15 of the host server receives a log file stored in the history management unit 10 of a client and a bookmark stored in the bookmark storage unit 13 from the client and analyzes the user's inclination such as tastes and objects in the transmission of a document containing an entry item.

The host server collects Internet documents containing entry items, stores them in a server database 14, and provides the user with the Internet document which matches the analysis results of the server analysis unit 15 namely, the user's tastes, objects, and the like from among the stored documents.

A server data browsing unit 16 which allows the browsing of an Internet document stored in the server database 14 of the host server, receives an Internet document selected by the user from the host server and stores it in the history management unit 10.

Figure 8:
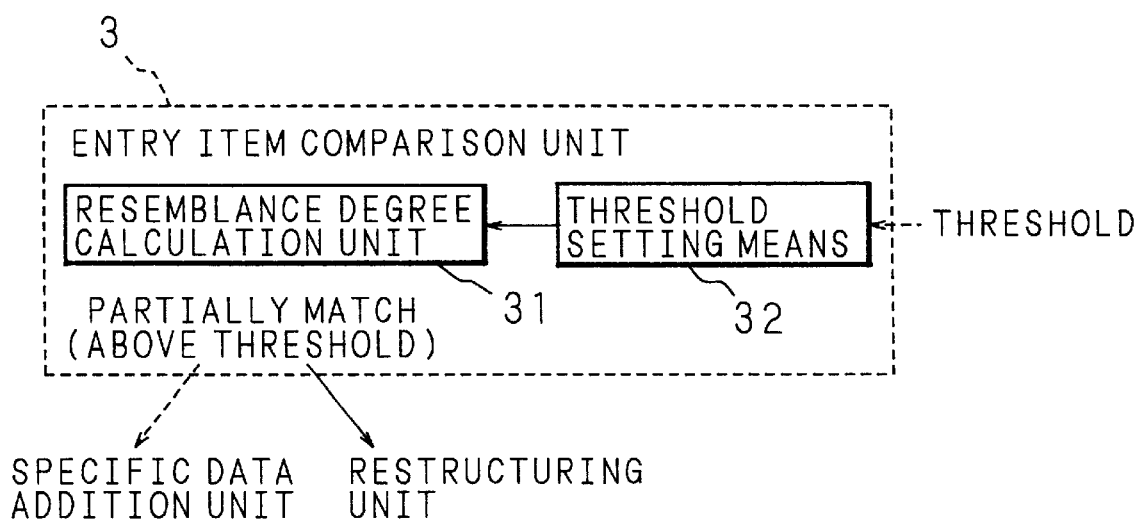
FIG. 8 is a block diagram showing a structural example of an entry item comparison unit.

FIG. 8 is a block diagram showing an example of the structure of the entry item comparison unit 3.

In the present embodiment, the entry item comparison unit 3 is provided with a resemblance degree calculation means 31 in the entry item comparison unit 3, which extracts an entry item key part of which matches the entry item key registered in the specific data database 2 from among the entry item keys detected by the entry item detection unit 1, calculates the degree of resemblance to the entry item key already registered, and considers the entry item key to be matched when the calculated degree of resemblance is equal to or larger than the threshold value set in a threshold setting means 32. The resemblance degree calculation means 31 can be embodied by applying a spell check function which is provided in an English word processor software or the like, a keyword partial matching retrieval function, a synonym thesaurus database reference function.

An entry item key whose degree of resemblance is equal to or higher than the predetermined value is considered to be matched with a registered entry item key and given to the restructuring unit 4.

An entry item key which has been partly matched with a registered entry item key is given to the specific data addition unit 5 (refer to FIG. 2), and additionally registered to the specific data database 2 together with the specific data keyed-in by the user for the entry item key.

As the threshold value, the user can externally set any value to the threshold setting means 32.

Figure 9:
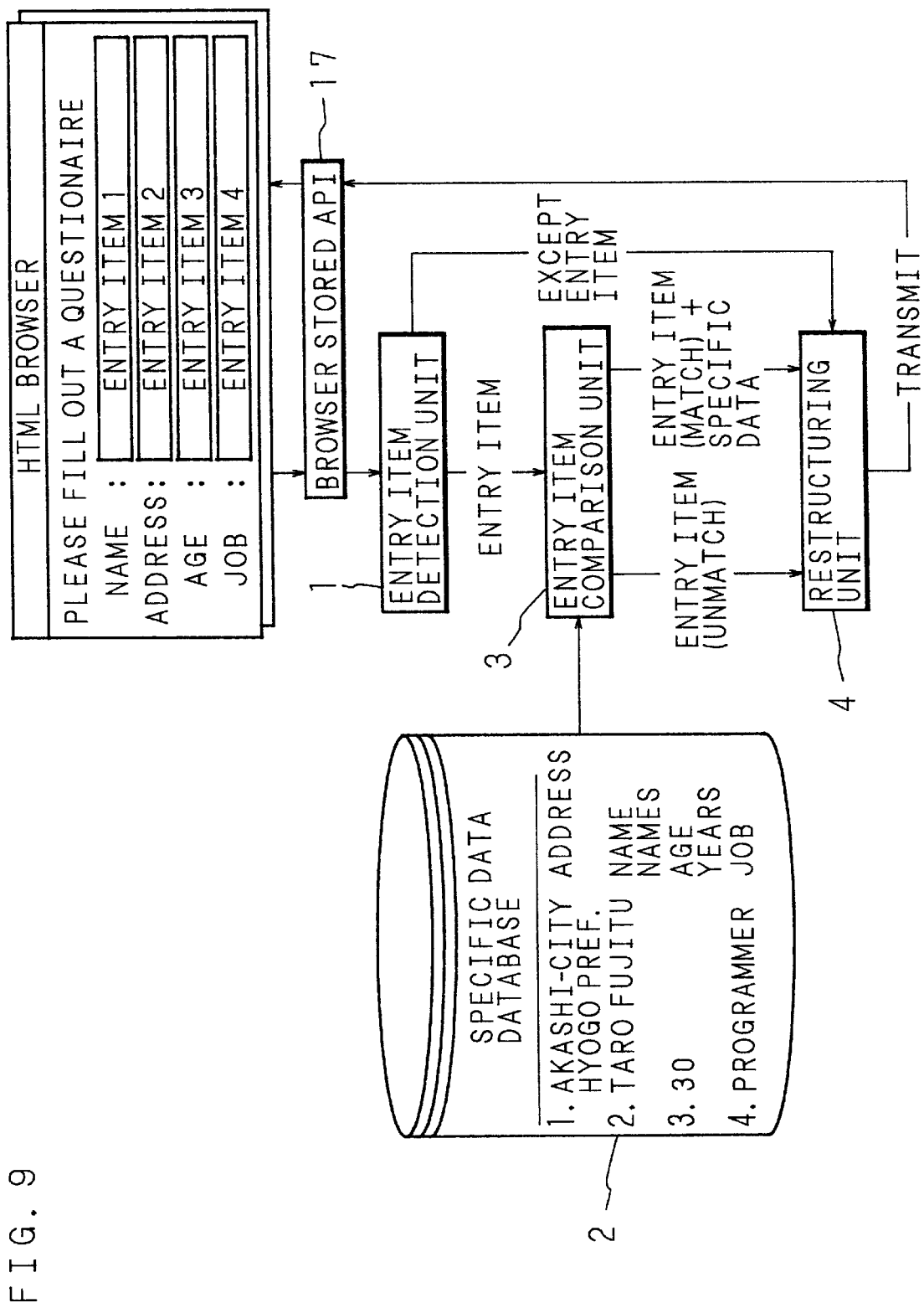
FIG. 9 is a functional block diagram showing a concrete example of the method of the present invention.

FIG. 9 is a functional block diagram showing a concrete example of the method of the present invention. The same units as those shown in FIG. 1 are designated by the same reference numbers and their explanation is omitted.

When an HTML browser has four entry items: "address", "name", "age", and "job" (entry item keys have the same names), the entry item detection unit 1 detects entry items through a browser stored API (Application Programming Interface) 17. The entry item keys of the detected four entry items are compared with the entry item keys in the specific data database 2 by the entry item comparison unit 3, and obtains specific data: "Akashi-city, Hyogo prefecture", "Fujitu Taro", "30", and "programmer" corresponding to the entry item keys which have been matched as a result of the comparison. The restructuring unit 4 recombines and transmits an entry item attached with the specific data obtained by the entry item comparison unit 3, an entry item not attached with specific data because it has not been matched as a result of the comparison, and the constituent elements other than the entry items. In the entry item of the HTML browser of the transmitted HTML document, specific data is entered through the browser stored API 17 at the transmission destination.

Figure 10:
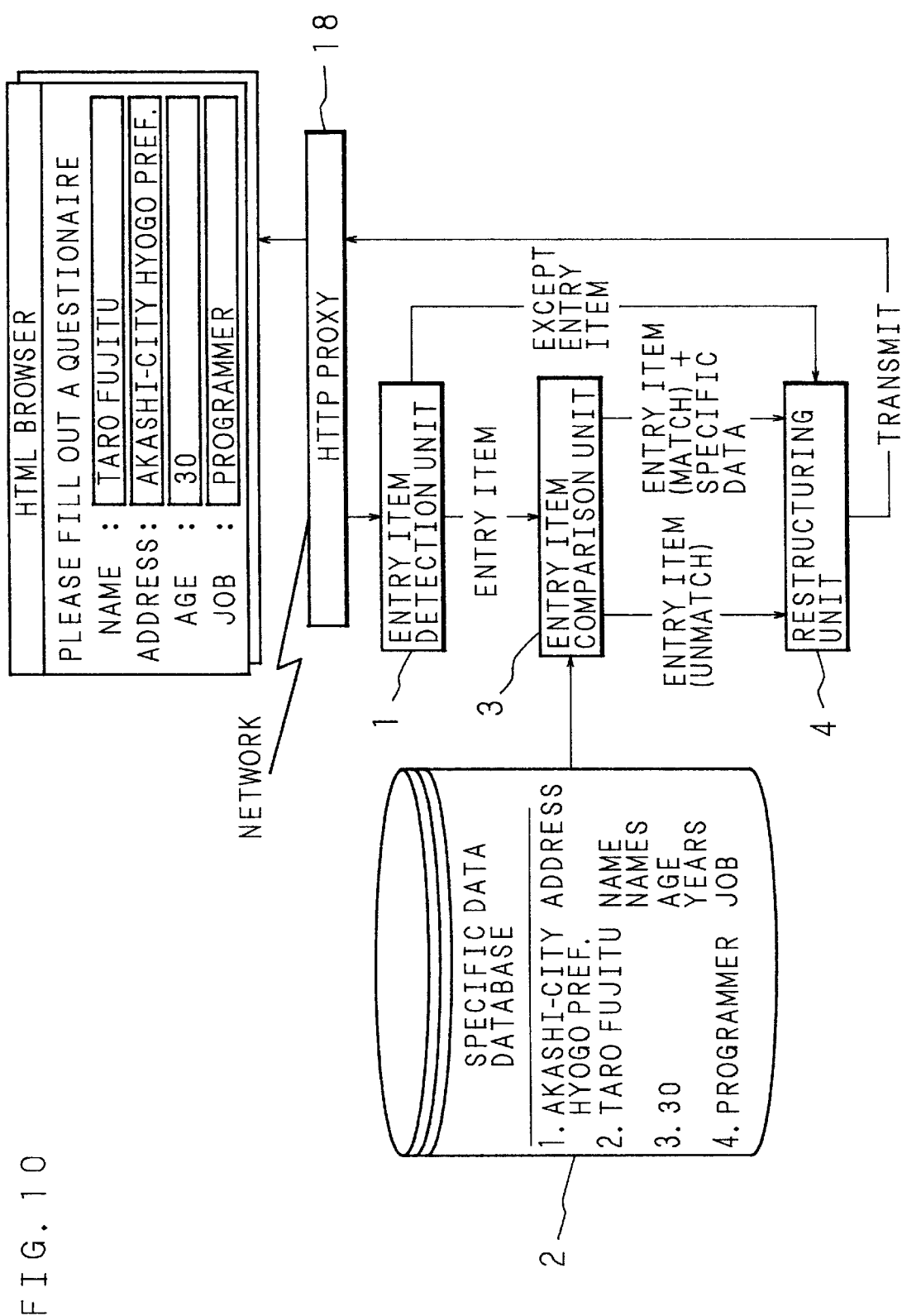
FIG. 10 is a functional block diagram showing another concrete example of the method of the present invention.

FIG. 10 is a functional block diagram showing another concrete example of the method of the present invention. The same units as those shown in FIG. 1 are designated by the same reference numbers and their explanation is omitted.

In the present embodiment, the access of the HTML browser to the network is conducted via an HTTP Proxy 18. The HTTP Proxy 18 constantly detects whether a page transmitted to the HTML browser contains an entry item (entry form) by using the entry item detection unit 1. When an entry item (entry form) is detected, the entry item comparison unit 3 compares the entry item key of the entry item with the entry item key in the specific data database 2, and obtains the specific data: "Akashi-city, Hyogo prefecture", "Fujitu Taro", "30", and "programmer" corresponding to the entry item key which has been matched as a result of the comparison.

The restructuring unit 4 recombines an entry item attached with the specific data obtained by the entry item comparison unit 3, an entry item not attached with specific data because it has not been matched as a result of the comparison, and the constituent elements other than the entry items, and restructures a page embedded with specific data. The output of the HTTP proxy 18 makes specific data be displayed in a manner to be filled in the entry item on the HTML browser. If the entry item key has not been registered in the specific data database 2, it is displayed as a blank.

Figure 11:
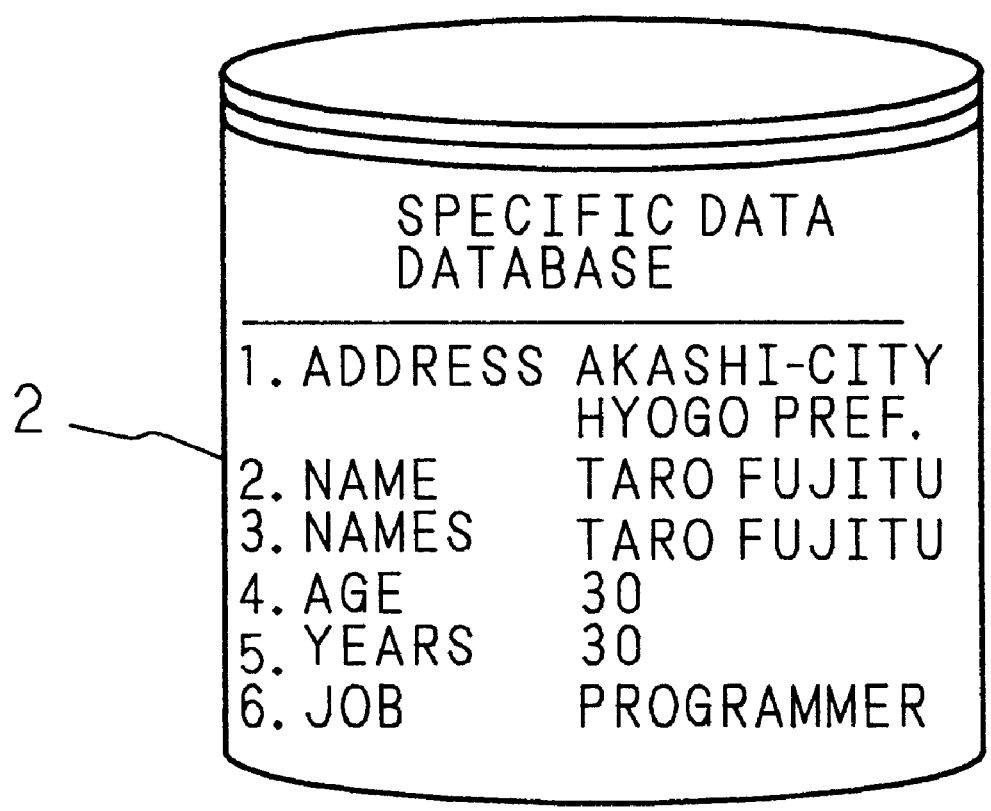
FIG. 11 is another conceptual drawing of another concrete example of the specific data database.

The specific data database 2 can control specific data and entry item keys in a one-to-one correspondence as shown in FIG. 11, besides the one-to-many correspondence shown in FIGS. 9 and 10.

The above-described program of the method of the present invention can be provided by being incorporated in the browser or by itself.

The program may be pre-installed in a communication device.

The program can be provided by a portable recording medium such as CD-ROM or through communication line.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of entering specific data in an entry item of a document received for data entry, constituent element of the entry item attached with document structure data, which contains an entry item key indicating an attribute of the specific data to be entered in the entry item, said method comprising:

receiving and storing a document containing said entry items;

entering and setting a transmission time for a document which has been restructured from the received document;

registering specific data and entry item keys in a one-to-one or one-to-many correspondence in a database or updating contents registered in said database;

detecting at the set transmission time in the document a constituent element which indicates an entry item based on said document structure data;

comparing an entry item key of the detected entry item with the entry item keys registered in said database;

restructuring said document for data entry by attaching to said entry item specific data corresponding to the registered entry item keys in said database which has been matched with the entry item key of the detected entry item as a result of the comparison; and executing the detecting, the comparing, and the restructuring according to said set transmission time and transmitting the restructured document at said set transmission time.

2. The method according to claim 1, further comprising:

storing data on transmission results of a document and data on an entry item in which specific data has not been entered; and outputting the stored data responsive to a request to refer to the stored contents.

3. The method according to claim 2, further comprising extracting a feature of identification data of a transmitting destination contained in data related to transmission results of a document and/or a feature of stored identification data of a transmitting destination when the data to identify the transmitting destination of the document is stored, and wherein in the receiving and the storing a document is selectively stored which agrees with the extracted feature among the received documents.

4. The method according to claim 1, further comprising:

receiving and storing in a server a document containing said entry item; and transmitting the document to a client.

5. The method according to claim 4, further comprising:

receiving in the server the identification data of a transmitting destination contained in the data related to the transmission results of the document and/or registered identification data of the transmitting destination from the client when identification data to identify a transmitting destination of a document is registered at a client and data related to transmission results of the document is stored at the client;

extracting in the server a feature contained in said identification data; and transmitting from the server to the client a document which agrees with the extracted feature from among documents containing entry items received and stored by the server.

6. The method according to claim 4, further comprising the server allowing the client to browse the stored document in response to the client's request.

7. The method according to claim 5, further comprising the server allowing the client to browse the stored document in response to the client's request.

8. A computer readable recording medium causing a computer to receive a document for entering data in an entry item of the document with a constituent element attached with document structure data, which contains an entry item key indicating an attribute of specific data to be entered in the entry item and causing said computer to enter said specific data in said entry item of the document for item data entry, said recording medium comprising:

a database registering said specific data correspondingly to entry item keys in a one-to-one or one-to-many correspondence or updating contents registered in said database;

program code means for entering and setting a transmission time for a document which has been restructured from the received document, program code means for causing said computer to detect in the received document a constituent element which indicates an entry item based on said received document structure data; program code means for causing said computer to compare an entry item key of the detected entry item with the entry item keys registered in said database; and program code means for causing said computer to restructure said received document for item data entry by attaching to said entry item specific data corresponding to each entry item key in the database which has been matched as a result of the comparison; and program code means for executing the detection, the comparison, and the restructuring according to said set transmission time and transmitting the restructured document at said set transmission time.

9. A communication device used to enter specific data in entry item of a structured document received by the communication device, constituent element of the entry item attached with document structure data, which contains an entry item key indicating an attribute of the specific data to be entered in the entry item, the communication device storing a process comprising:

entering and setting a transmission time for a document which has been restructured from the received structured document;

registering keywords and specific data associated with each keyword;

detecting in the received document a constituent element which indicates an entry item based on the document structure data;

comparing an entry item key of a detected entry item with the keywords;

restructuring the received document for data entry by attaching to the entry item specific data corresponding to a keyword matched with the entry item key of the detected entry item in the comparing; and executing the detecting, the comparing, and the restructuring according to said set transmission time and transmitting the restructured document at said set transmission time.

* * * * *